Sept. 28, 1971  R. D. PLANT  3,608,446

MATERIAL DELIVERY SYSTEM

Filed Aug. 22, 1969  6 Sheets-Sheet 1

INVENTOR
ROBERT D. PLANT

Richards, Harris & Hubbard
ATTORNEY

Sept. 28, 1971   R. D. PLANT   3,608,446
MATERIAL DELIVERY SYSTEM

Filed Aug. 22, 1969   6 Sheets-Sheet 3

INVENTOR
ROBERT D. PLANT

Richards, Harris & Hubbard

ATTORNEY

INVENTOR
ROBERT D. PLANT

ATTORNEY

INVENTOR
ROBERT D. PLANT

Richards, Harris & Hubbard

ATTORNEY

United States Patent Office 3,608,446
Patented Sept. 28, 1971

3,608,446
MATERIAL DELIVERY SYSTEM
Robert Dale Plant, Murfreesboro, Ark., assignor to
Arkansas Rock and Gravel Company, Murfreesboro,
Ark.
Filed Aug. 22, 1969, Ser. No. 852,350
Int. Cl. E01c 19/00
U.S. Cl. 94—39                                    19 Claims

ABSTRACT OF THE DISCLOSURE

Hot asphalt transported to paving machines in a fleet of semi-trailers. Each trailer comprises a V-shaped hopper having bridging members extending across it for reducing asphalt packing in the hopper. Heat ducts extend through the structural members of each trailer for use in preheating the hopper. Each trailer includes a conveyor for unloading the asphalt from the hopper to a paving machine. During unloading, the conveyor is controlled from the paving machine. This assures the delivery of asphalt at the proper rate and prevents the unloading of asphalt when the trailer and the paving machine are separated.

BACKGROUND OF THE INVENTION

In the paving industry, hot asphalt is commonly transported to paving sites in dump trucks. The trucks receive hot asphalt from an asphalt mixing mechanism located at an asphalt plant and deliver it to paving machines located at the paving sites. Modern paving machines have the ability to lay down hot asphalt very rapidly. Because of this, a large number of dump trucks is required to keep a paving machine supplied with asphalt, especially when the machine is located at a paving site remote from the asphalt plant.

As the number of trucks employed to transport hot asphalt to paving machines increases, a number of problems arise. For example, delays caused by traffic problems and the like are magnified when a large number of trucks are involved. Also, the logistics of truck maintenance increase greatly. Finally, it is more difficult to keep track of and control over a large number of trucks. Thus, it is highly desirable to reduce the number of trucks employed in an asphalt supply operation.

Heretofore, attempts to reduce the number of trucks required to supply asphalt to paving machines have centered around the design and use of large capacity dump trucks for transporting hot asphalt. Large capacity dump trucks have not gained wide acceptance for use in transporting asphalt because the use of the trucks results in several problems. For example, asphalt supply trucks must be operated in such a manner as to feed the asphalt gradually into the paving machines. When dump trucks are used to supply asphalt, this is accomplished by slowly raising the bed of the truck as the truck moves forward ahead of the paving machine. During such a process, if the dump truck and the paving machine become separated, asphalt is dumped onto the ground ahead of the paving machine. In such an event, the asphalt must be shoveled away from the path of the paving machine before any more asphalt can be laid down. Obviously, the larger the capacity of the dump truck, the greater the shoveling problem is whenever a separation occurs.

Another problem that results from the use of large capacity dump trucks involves the tendency of asphalt to form into clumps or batches. These clumps tend to remain in the bed of a dump truck as it is raised and to then fall suddenly through the rear of the truck into the paving machine that is receiving asphalt from the truck. When this occurs the paving machine forms waves or ridges in the pavement being laid down. Also, when large clumps fall from a dump truck, the truck often becomes dangereously unbalanced.

Yet another problem that arises from the use of large dump trucks relates to overhead obstructions such as wires, trees, viaducts, etc. Asphalt cannot be delivered to a paving machine from a dump truck except by raising the bed of the truck. When an overhead obstruction prevents the raising of the bed other means of delivering asphalt to the paving machine must be found.

A very critical problem involving the use of large capacity dump trucks to transport asphalt results from the tendency of asphalt to flow from the rear or bottom of a dump bed first and to remain in the front or top of the bed as the bed is raised. Most large capacity dump trucks have a relatively long dump bed. The presence of asphalt in the front or top of a long dump bed as the bed is raised results in a very marked tendency of the truck to tip over. This problem is so acute that large capacity dump trucks are seldom used to transport asphalt to paving sites having any appreciable slant or bank.

This invention relates to a material delivery system in which hot asphalt is transported to paving machines in large capacity semi-trailers. Each trailer is provided with a conveyor system for moving the asphalt from the trailer to a paving machine. The trailers are not dumped and, accordingly, the problems of asphalt clumping and truck overturning experienced in the use of large capacity dump trucks are eliminated. Operation of the trailers is controlled from the paving machines that receive the asphalt. This assures both delivery of the asphalt at the proper rate and immediate termination of delivery upon separation of the trailer and the paving machine.

SUMMARY OF THE INVENTION

In accordance with the preferred embodiment, this invention comprises a plurality of vehicles each for transporting material from a delivery device to a receiving device and each including an unloading mechanism for despensing material to the receiving device. During unloading of a vehicle, the operation of the unloading mechanism of the vehicle is controlled from the receiving device. Preferably, the vehicles are semi-trailers and the unloading mechanisms are conveyors which extend along the axial centers of the trailers.

DESCRIPTION OF THE DRAWINGS

A more complete understanding of the invention may be had by referring to the following detailed description when taken in conjunction with the drawings, wherein.

DETAILED DESCRIPTION

Figure 1:
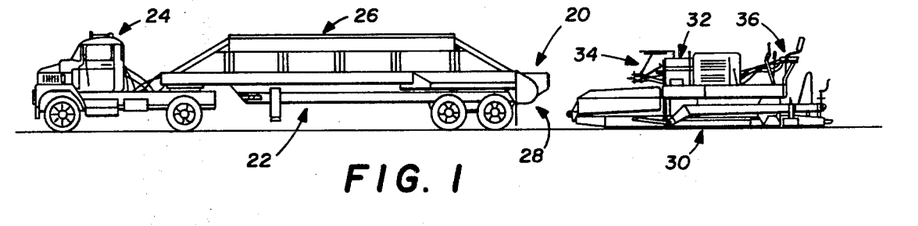
FIG. 1 is a side view of a portion of a material delivery system employing the invention.

Referring now to the drawings, like reference numerals designate like parts throughout the several views. Referring particularly to FIG. 1, there is shown a material delivery system 20 employing the invention. The delivery system 20 includes a plurality of semi-trailers 22 (only one of which is shown) each adapted for a connection to and transportation by a conventional tractor 24. Each of the trailers 22 includes a hopper assembly 26 and an unloading assembly 28.

The trailers 22 of the system 20 receive hot asphalt from an asphalt mixing mechanism located at an asphalt plant (not shown) and deliver the hot asphalt to a paving machine 30 located at a paving site. The paving machine 30 supplied by the trailers 22 is conventional except that it is equipped with a power unit 32 for operating the unloading assemblies 28 of the trailers 22, a connection assembly 34 for coupling the power unit 32 to the unloading assemblies 28 and a control unit 36 for controlling the operation of the unloading assemblies 28.

Figure 5:
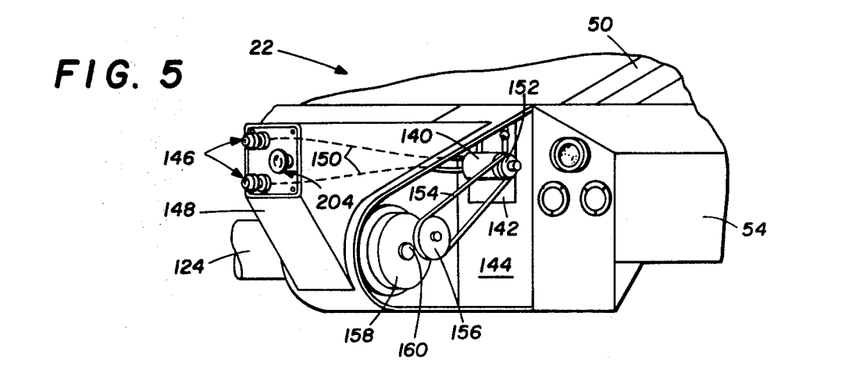
FIG. 5 is a partial perspective view of the trailer shown in FIG. 2 in which certain parts have been broken away.
Figure 6:
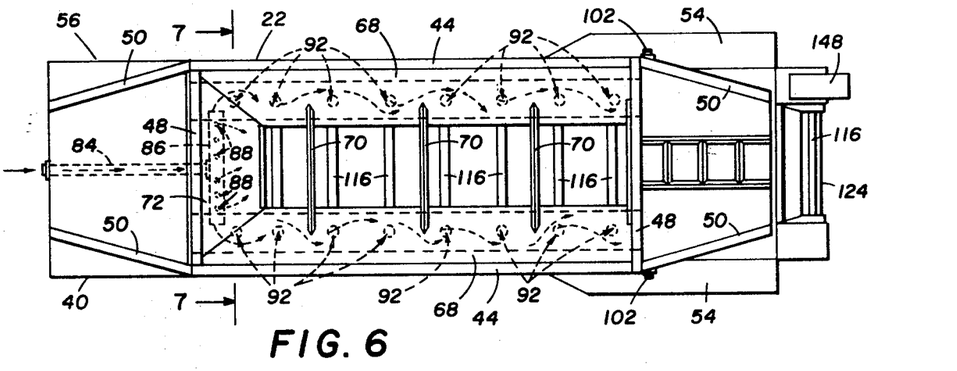
FIGS. 6, 7 and 8 are top, transverse sectional and side views, respectively, of the trailer shown in FIG. 2 which, taken together, illustrate a preheating system employed in the invention.
Figure 7:
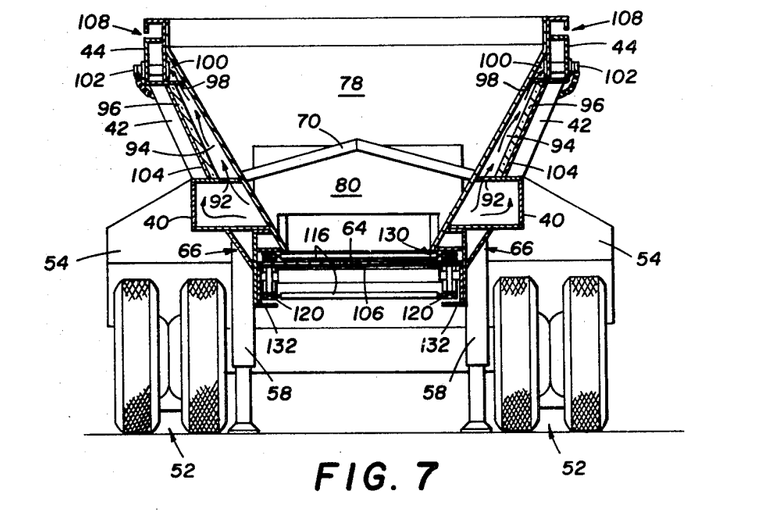
Figure 8:
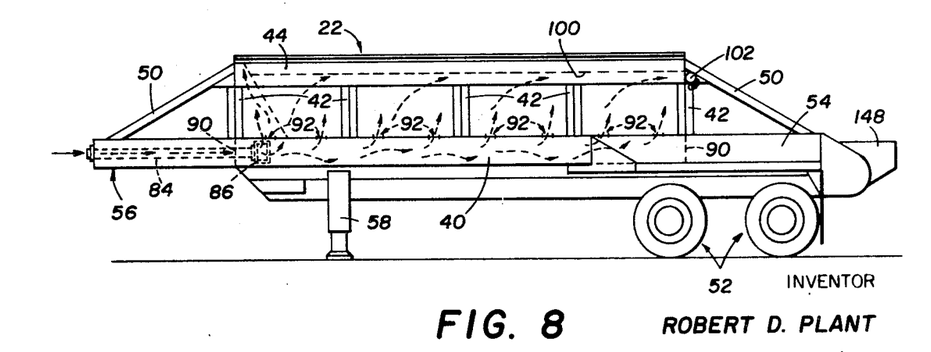

Referring now to FIGS. 2 through 8 and particularly to FIGS. 7 and 8, the structural detail of the trailers 22 of the system 20 are shown. The main structural elements of each trailer 22 are a pair of main beams 40 extending the length of the trailer 22. A plurality of support beams 42 extend upwardly and outwardly from each of the beams 40. A top beam 44 extends along each side of the trailer 22 and is connected to the tops of the beams 42. A pair of end beams 48 extend between the ends of the top beams 44 and two pairs of slanting beams 50 extend from the main beam 40 to the top beam 44 at the front and at the rear of the trailer 22.

The main beams 40 of each trailer 22 are supported on a pair of conventional wheel and axle assemblies 52. A pair of fenders 54 extend outwardly from the main beams 40 over the wheels of the wheel and axle assemblies 52. At the front end of each trailer 22, a conventional gooseneck assembly 56 including a conventional fifth wheel (not shown) is provided for attaching the trailer 22 to a conventional tractor 24. A pair of conventional support jacks 58 extend downwardly from the main beam 40 for supporting the trailer 22 whenever it is not connected to a tractor 24.

Figure 3:
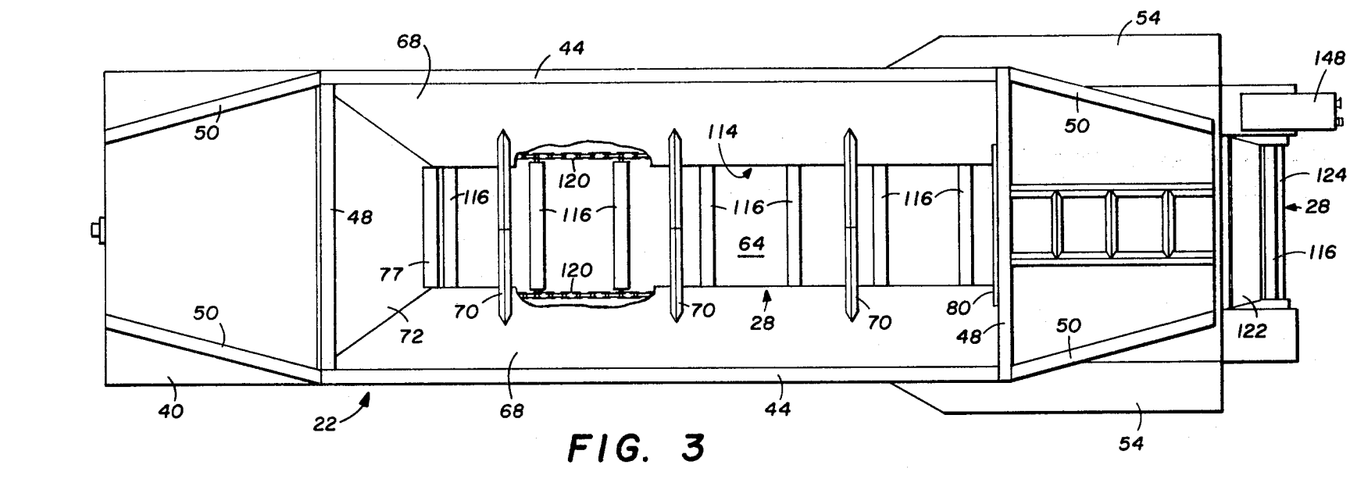
FIG. 3 is a top view of the trailer shown in FIG. 2 in which certain parts have been broken away.
Figure 4:
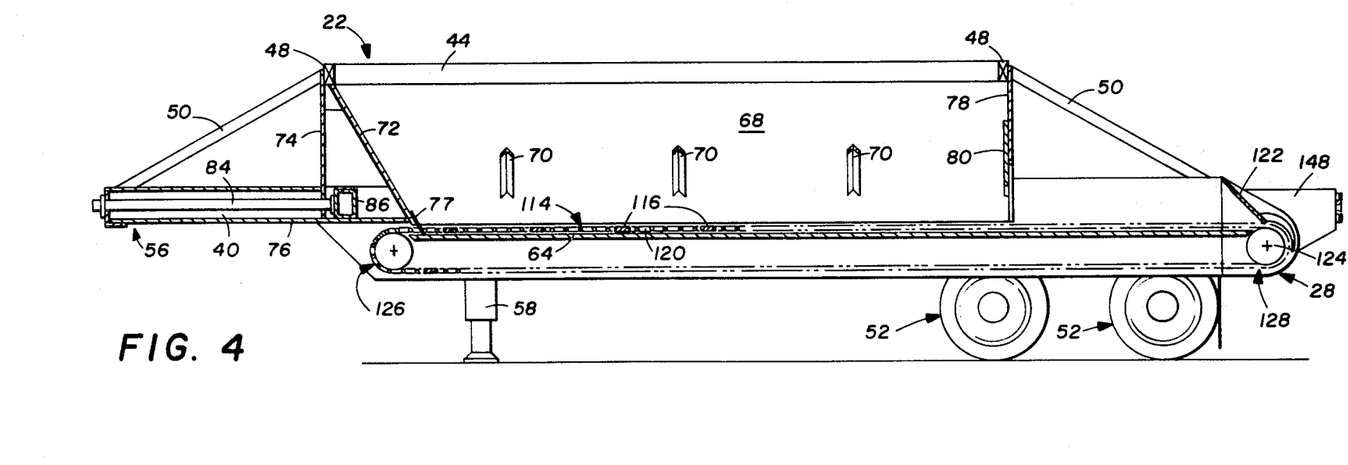
FIG. 4 is a side view of the trailer shown in FIG. 2 in which certain parts have been broken away and certain other parts illustrated schematically.

The details of the hopper assemblies 26 of the trailers 22 are illustrated in FIGS. 3, 4 and 7. Each hopper assembly 26 includes a floor 64 which is supported below the main beams 40 of the trailer 22 by a pair of subframe assemblies 66. A pair of side walls 68 slope upwardly and outwardly with respect to the floor 64 and are supported on the main beams 40 and the top beams 44. The walls 68 each extend at an angle of approximately 60° with respect to the floor 64. Three bridging members 70 extend across the hopper 26 between the side walls 68 over the floor 64. As is best shown in FIG. 7, the bridging members 70 slant upwardly from the walls 68 to a peak positioned in the center of the trailer 22.

Each hopper 26 further includes a sloping front wall 72 extending between the main beams 40 and the end beam 48 at the front of the trailer 22. As is best shown in FIG. 4, the front wall 72 is reinforced by a plate 74 which extends vertically between the main beams 40 and the end beam 48 and a plate 76 which extends horizontally between the main beams 40 of the trailer 22. A rubber sealing member 77 extends from the front wall 72 to the floor 64. At the rear of the trailer 22, a rear plate 78 extends downwardly from the rear end beam 48. A door or gate 80 is slidably supported on the rear plate 78 for movement from a lower position wherein the rear of the hopper 26 is substantially closed to the raised position illustrated in FIG. 4.

Referring now to FIGS. 6, 7 and 8, a system for preheating the hoppers 26 of the trailers 22 to prevent cooling of hot asphalt deposited into the hoppers by asphalt mixing mechanisms located at asphalt plants is illustrated. Hot gases produced by a butane or kerosene torch or any other source of heat are introduced into a pipe 84 positioned at the front of each trailer 22. The pipe 84 extends to a square shaped pipe 86 which in turn extends between the main beams 40 of the trailer 22. Because of the direct connection between the pipe 84, the pipe 86 and the beams 40, most of the hot gases introduced into the pipe 84 flow through the pipe 84 and the pipe 86 into the main beams 40 of the trailer 22. However, a portion of the gases flows through a plurality of small diameter holes 88 formed in the upper surface of the pipe 86 into the triangularly shaped cavity between the sloping front wall 72 and the vertically extending plate 74 of the trailer 22.

As is best shown in FIG. 8, a pair of bulkheads 90 are positioned in the main beams 40 of the trailer 22 at the front and rear ends thereof. The bulk heads 90 limit the flow of hot gases through the main beams 40 of the trailer to the center portion of the main beams. From the main beams 40, the hot gases flow through a plurality of small diameter, circularly shaped holes 92 formed in the upper surfaces of the main beams 40 into a pair of channels 94 positioned between the walls 68 and a pair of plates 96 which extend between the main beam 40 and the top beams 44 of the trailer 22. From the channels 94, the hot gases flow through a plurality of larger diameter, semicircularly shaped hoes 98 formed through the lower surfaces of the top beams 44 into a pair of triangularly shaped channels 100 formed between the side walls 68 and the top beams 44. The hot gases flow through the channels 100 to a pair of outlet tubes 102 extending from the channels 100 through the top beams 44.

The pipe 84 and the tubes 102 of the preheating system shown in FIGS. 6, 7 and 8 are normally capped or plugged. Whenever a hopper 26 is to be preheated, the plugs are removed from the pipe 84 and the tubes 102 and hot gases are introduced into the pipe 84. This process is continued until the hot gases begin to flow out the tubes 102, whereupon the tubes 102 and the pipe 84 are again plugged. The space between the sloping front wall 72 and the vertically extending plate 74 extends across the entire width of the wall 72. The channels 94 extend along the entire length of the side wall 68. Therefore, as the hot gases flow from the pipe 84 to the tubes 102 the entire interior surface of the hopper 26 is preheated to prevent excessive cooling of asphalt placed in the hopper 26.

In addition to the preheating system illustrated in FIGS. 6, 7 and 8, the loss of heat from asphalt contained within the hopper 26 is prevented by layers of insulation 104 mounted on the outer surfaces of the plates 96 and a layer of insulation 106 mounted on the lower surface of the floor 64. Finally, a pair of channels 108 are formed in the top beams 44 of the trailer 22 at the upper ends of thereof. The channels 108 may be used to position a heat retaining roof (not shown) over the hopper 26 of the trailer 22, if desired.

FIGS. 3, 4, 5 and 7 illustrate the details of the unloading assemblies 28 of the trailers 22. As is best shown in FIG. 4 each unloading assembly 28 comprises a conveyor 114 which passes through the hopper 26 and out the rear end of a trailer 22. As is best shown in FIG. 3, the conveyor includes a plurality of evenly spaced bars 116 and a pair of chains 120 connected to the opposite ends of the bars 116. The chains 120 move the bars 116 through the hopper 26 from front to rear along a course extending just over the floor 64. From the hopper 26, the bars 116 pass under a gate 122 that is hingedly supported at the rear of the trailer 22 and around a large diameter roller 124. From the roller 124, the chains 120 drive the bars 116 along a course extending under the hopper 26 and then under the sealing member 77 and into the front end of the hopper 26.

As is best shown in FIG. 4, the chains 120 each extend between a sprocket 126 positioned at the front of the trailer 22 and a sprocket 128 positioned at the rear of the trailer 22. As is shown in FIG. 7, the chains 120 are protected by a pair of grooves 130 formed between the lower ends of the walls 68 and the floor 64 as they travel through the hopper 26. As the chains 120 pass under the hopper 26 on their return course, they are protected by a pair of flanges 132 extending from the sub-frames 66. The bars 116 of the conveyor 114 are purposely exposed during their travel along the return course so that any material from the hopper 26 which accumulates on or between the bars 116 during their travel through the hopper 26 is free to fall away from the bars 116 before they re-enter the hopper 26.

Figure 2:
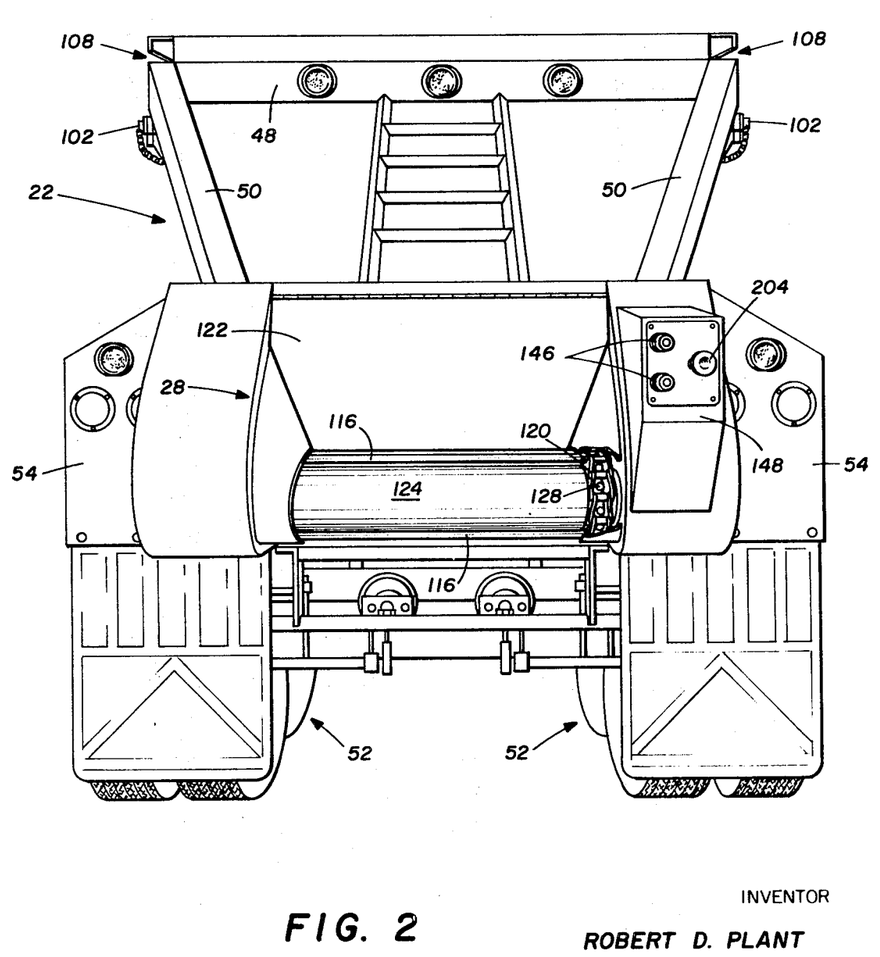
FIG. 2 is a back view of a semi-trailer employed in the system shown in FIG. 1.

Referring now to FIGS. 2 and 5, the details of the drive for the conveyor assembly 28 are shown. A hydraulic motor 140 is attached to a plate 142 which is in turn adjustably supported on a bulkhead 144 secured to the rear of one of the main beams 40 (not shown in FIGS. 2 and 5) of the trailer 22. The motor 140 is operated by hydraulic fluid supplied through a pair of male coupling fittings 146 which extend from a coupling housing 148 that in turn extends from the rear of the trailer 22. The coupling members 146 are connected to the motor 140 by a pair of hydraulic tubes 150. The motor 140 drives a sprocket 152 which in turn drives a chain 154. The chain 154 drive the input 156 of a shaft mounted speed reducer 158. The speed reducer 158 is mounted on a shaft 160 which extends across the back of the trailer 22. The shaft 160 supports and drives the sprocket 128 which in turn drives the chains 120. Thus, whenever hydraulic fluid is supplied to the motor 140 through the coupling members 146, the motor rotates the shaft 160 through the sprocket 152, the chain 154 and the speed reducer 158. The shaft 160 in turn rotates the sprockets 128 which drives the conveyor 114.

Figures 9, 11:
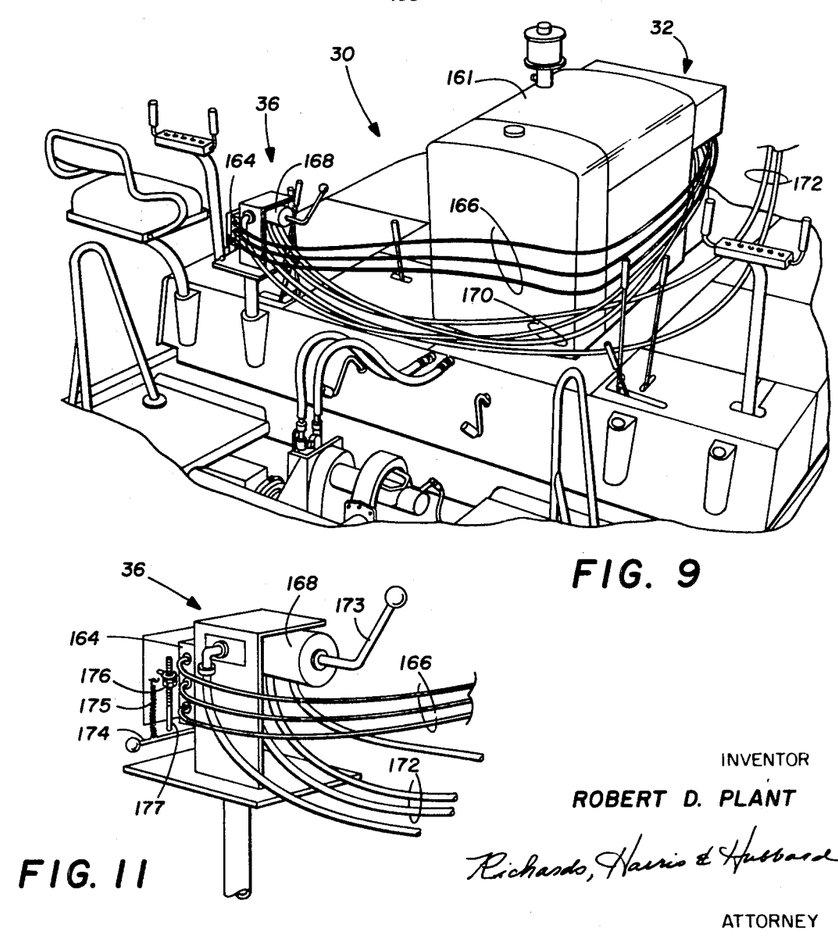
FIG. 9 is a rear perspective view of a portion of a paving machine modified in accordance with the invention.
FIG. 11 is an enlarged view of a control unit useful in the practice of the invention.
Figure 10:
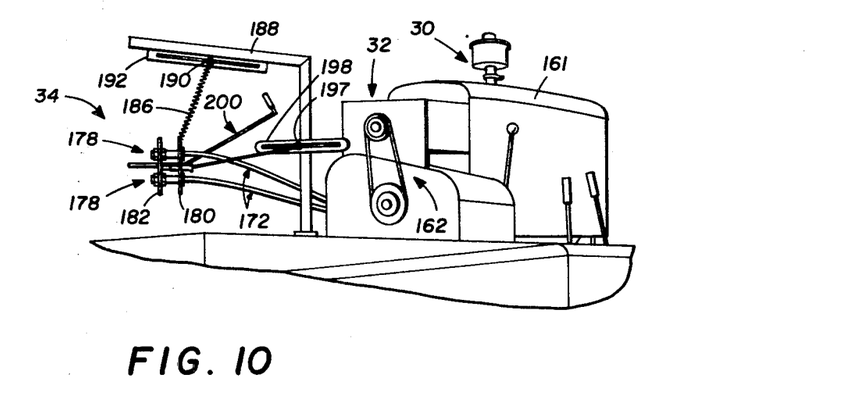
FIG. 10 is a front perspective view of a portion of the paving machine shown in FIG. 9.

Hydraulic fluid for operating the motor 140 is supplied under pressure to the motor 140 by the power unit 32 mounted on the paving machine 30 of the system 20. As is shown in FIGS. 9, 10 and 11, the power unit 32 is mounted at the forward end of the engine 161 of the paving machine 30 and is driven by the engine 161 through a belt and pulley drive system 162. The operation of the power unit 32 is controlled from the control unit 36 which may be supported at either side of the paving machine 30, depending upon the position occupied by the operator of the paving machine 30. The control unit 36 includes a delivery rate control valve 164 which is coupled to the power unit 32 by three tubes 166 and an on-off valve 168. The valve 168 is coupled to the power unit 32 by a pair of tubes 170 and is coupled to the connection assembly 34 by a pair of tubes 172.

The valve 168 has a control handle 173 the position of which determines whether or not hydraulic fluid is supplied to the motor 140 through the tubes 172. The valve 164 has a control handle 174 the position of which governs the rate of fluid flow through the tubes 172. The control handle 174 of the valve 164 is normally retained in a predetermined position by the cooperation of a spring 175 and a nut 176 threadedly engaged with an extension 177 of the control handle 174. The control handle 174 may be moved downwardly against the action of the spring 175 whenever it is desired to increase the rate of fluid flow through the tubes 172.

Figure 12:
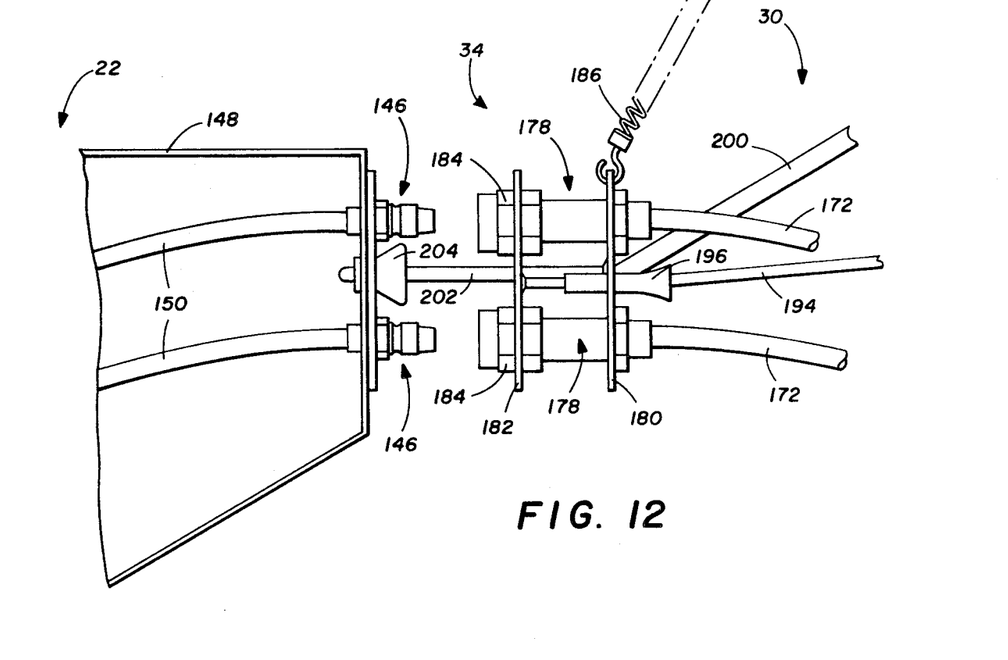
FIG. 12 is an enlarged side view of a coupling mechanism employed in the invention.
Figure 13:
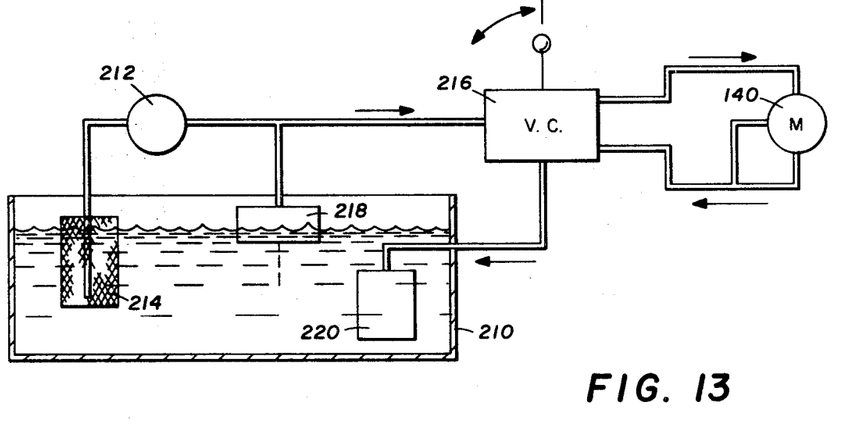
FIG. 13 is a schematic illustration of a hydraulic circuit employed in the invention.

The power unit 32 is coupled to the motor 140 of the trailer 22 by the connection assembly 34, the details of which are illustrated in FIGS. 10, 12 and 13. The tubes 172 extend from the valve 168 of the control unit 36 to a pair of female quick disconnect fittings 178. The fittings 178 are adapted to mate with the male fittings 146 mounted in the housing 148 to couple the tubes 172 to the tubes 150. The connection assembly 34 includes a rear plate 180 which supports the fittings 178 and a front plate 182. The actuating portions 184 of the fittings 178 are secured to the front plate 182. The connection assembly 34 is supported by a spring 186 which extends from the rear plate 180 to a bracket 188 that is rotatably supported on the paving machine 30 of the system 20. The spring 186 extends to a traveling member 190 which is slidably supported in a track 192 fixed to the bracket 188.

The connection assembly 34 is connected to the paving machine 30 by a cable 194 which extends from the front plate 182 through a guide member 196 mounted in the rear plate 180 to a traveling member 197 which is slidably supported in a track 198 fixed to the bracket 188. A handle 200 extends rearwardly from the rear plate 180 for use in guiding the connection assembly 34. A rod 202 extends forwardly from the rear plate through the front plate 182. A female member 204 mounted on the housing 148 receives the rod as the fittings 178 of the assembly 37 is engaged with the fittings 146 of a trailer 22.

In use, the handle 200 is used to manipulate the positioning of the connection assembly 34 relative to a trailer 22 as the trailer is backed toward the paving machine 30. The pivoted support of the bracket 188 and the support of the spring 186 on the traveling member 190 permits sufficient maneuverability of the assembly 34 to overcome any misalignment between the trailer 22 and the paving machine 30 as the trailer is backed toward the paving machine. As soon as possible, the rod 202 is engaged with the female member 204. This assures proper alignment of the fittings 178 with the fittings 146 as the coupling member is moved toward the housing 148.

The fittings 178 are so constructed that the actuating portions 184 of the fittings 178 remain in an uncoupled state whenever the fittings 178 are disconnected from the fittings 146. As soon as the fittings 178 engage the fittings 146, the actuating portions 184 snap forward to lock the fittings 178 to the fittings 146. This action forms a direct coupling between the tubes 172 and the tubes 150 and therefore supplies hydraulic fluid from the power unit 32 through the control unit 36 and the connection assembly 34 to the motor 140.

During the unloading of a trailer 22, the valves 168 and 164 are operated to start and stop the motor 140 and to control the speed of operation of the motor 140, respectively. At the end of the unloading operation, the control handle 174 of the valve 164 is moved downwardly against the action of the spring 175. This increases the rate of flow of hydraulic fluid to the motor 140 which in turn causes the motor to drive the conveyor 114 more rapidly, thereby quickly unloading any asphalt remaining in the trailer 22 into the paving machine 30.

In the event the trailer 22 and the paving machine 30 become separated during the unloading operation, the cable 194 moves the plate 182 rearwardly with respect to the plate 180, thereby moving the operating portions 184 of the fittings 178 rearwardly. When the operating portions 184 are moved rearwardly a predetermined distance, the fittings 178 are immediately uncoupled from the fittings 116. This breaks the driving connection between the power unit 32 and the motor 140. Since the motor 140 requires power from the paving machine 30 to operate, this action immediately stops the unloading of asphalt from the trailer 22.

Figure 14:
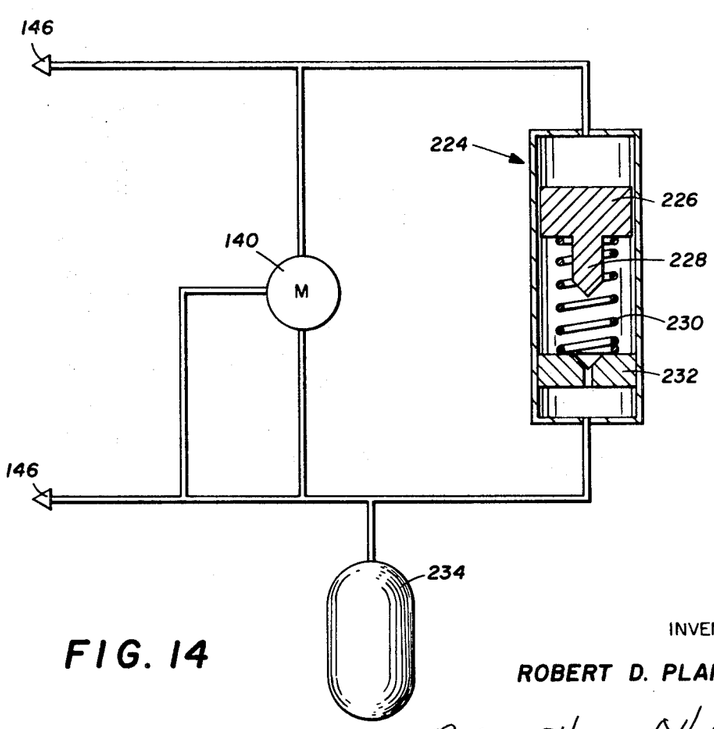
FIG. 14 is a schematic illustration of a portion of the circuit shown in FIG. 14 useful in facilitating interconnection of portions of the system shown in FIG. 1.

The operation of the power unit 32, the control unit 36 and the motor 140 may be further understood by referring to FIG. 14. The power unit 32 includes a tank 210 which contains a supply of hydraulic fluid. A pump 212 withdraws hydraulic fluid from the tank 210 through a strainer 214 and supplies fluid under pressure to a control valve 216 similar to the valve 168.

The valve 216 is an open valve. Accordingly, when the valve 216 is closed, hydraulic fluid returns to the tank 210, through the center of the valve. When the valve 216 is open, the valve 216 directs pressurized hydraulic fluid from the pump 212 to the motor 140. From the motor 140, the fluid is returned to the valve 216 which in turn directs the fluid into the tank 210 through a filter 220.

It should be understood that in some material delivery systems it may be desirable to operate the motor 140 from a power unit 32 mounted on the tractor 24 and operated by the power takeoff of the tractor. In such a case, the volume of hydraulic fluid delivered by the pump 212 is controlled by simply controlling the speed of rotation of the engine of the tractor 24. Operation of the valve 216 in such a system is controlled from the paving machine 30. This is accomplished either by mounting the valve 216 on the trailer and positioning the control handle of the valve 216 for actuation by a member extending from the paving machine 30 or by mounting the valve 216 on the paving machine 30 and connecting the valve 216 to the motor 140 by a coupling similar to the connection assembly 34.

In most material delivery systems it is preferable to mount the power unit 32 on the paving machine in order to reduce the number of power units necessary in the system. Since the engine 161 of the paving machine 30 operates the paving machine itself, it is ordinarily not practical to control the speed of operation of the pump 212 by controlling the speed of operation of the engine 161 of the paving machine. Therefore, when the power unit 32 is mounted on the paving machine, the pump 212 is a variable flow pump. When such a pump is employed, the rate of delivery of hydraulic fluid to the motor 140 is controlled by the valve 164 through the tubes 166 extending from the valve 164 to the pump.

Referring now to FIG. 14, there is shown a system 222 for lowering the amount of pressure that must be exerted on the fittings 178 in order to couple them to the fittings 116. The system includes a sliding piston check valve assembly 224 including a piston 226 having a pointed valving member 228 extending downwardly from it and a spring 230 which normally urges the valving member 228 away from a hole 232 having a seat capable of withstanding high pressures without leaking. The system 222 further includes an accumulator 234.

The system 222 operates to ease the engagement of the fittings 178 with the fittings 146. When the upper fittings 178 is engaged with the upper fittings 146, any pressure which builds up between the fitting 178 and the fitting 146 simply drives piston 226 downwardly allowing fluid to flow into the accumulator 234 until the piston 226 seats. The piston 226 has more than enough travel to accommodate any increase in pressure between the upper fittings 146 and the motor 140 caused by engagement of the upper fitting 146 with the upper fitting 178. When the lower fitting 178 is engaged with the lower fitting 146, any pressure which is built up between the lower fitting 116 and the motor 140 is absorbed in the accumulator 234.

During the regular operation of the system 20, hydraulic fluid is supplied under high pressure to the upper fitting 146. This pressure drives the piston 126 downwardly, thereby engaging the valving member 228 with the cavity 232 to block the flow of fluid through the system 222. The pressure exerted by the accumulator 234 on the system 222 is higher than the return pressure in the system and accordingly, the accumulator 234 does not enter the normal operation of the system in any manner.

It should be understood that although a hydraulic system is illustrated in the drawings, the unloading assembly 28 of a particular trailer 22 can be driven by either an electric motor or an internal combustion engine, if desired. In the case of an internal combustion engine, the throttle of the engine would be adapted for control from the paving machine 30. In the case if an electric motor, the power source for the motor could be located either on the trailer 22 or the paving machine 30 so long as control over the speed of the motor from the lay down machine were available.

In use, the material delivery system 20 transports hot asphalt from an asphalt mixing mechanism located at an asphalt plant to a paving machine 30 located at a paving site in one or more semi-trailers 22. Each trailer is preheated prior to receiving asphalt from the asphalt mixing mechanism. This is accomplished by removing the plugs from the pipe 84 and the tubes 102 of the trailer and then injecting hot gases into the pipe 84. When the hot gases begin to flow out of the tubes 102, the pipe 84 and the tubes 102 are plugged or capped. Hot asphalt is then loaded into the trailer 22 from the asphalt mixing mechanism. When the loading of the trailer 22 has been completed, the trailer is transported to the paving site by a tractor 24.

During transportation to the paving site and during any period of time that the trailer 22 is parked at the paving site awaiting unloading, the asphalt in the trailer 22 is maintained in a heated state by the hot gases in the preheating system of the trailer 22 and by the layers of insulation 104 and 106 on the plates 96 and floor 64, respectively, of the trailer 22. When the paving machine 30 is ready to receive asphalt from the trailer 22, the trailer 22 is backed into engagement with the paving machine 30 by the tractor 24. The trailer 22 is easily backed into engagement with the paving machine 30 because the sloping sides of the trailer 22 allow the operator of the tractor 24 to see the paving machine 30 very easily.

As the trailer 22 nears the paving machine 30, the handle 200 of the connection assembly 34 is manipulated to guide the rod 202 on the assembly 34 into the female member 204 on the housing 148. This in turn guides the female quick disconnect fittings 178 on the connection assembly 34 into engagement with the male quick disconnect fittings 146 on the housing 148 of the trailer 22. As soon as the fittings 178 engage the fittings 146, the fittings 178 lock onto the fittings 146 to connect the tubes 172 on the paving machine 30 to the tubes 150 on the trailer 22.

The flow of hydraulic fluid from the power unit 32 to the motor 140 through the tubes 172 and the tubes 150 is controlled from the control unit 36. The nut 176 is adjusted on the extension 177 of the handle 174 to determine the position of the handle 174. The position of the handle 174 in turn controls the rate of fluid flow from the power unit 32 to the motor 140. The position of the handle 173 of the valve 168 determines whether or not hydraulic fluid flows to the motor 140 at the rate determined by the position of the handle 174. That is, actuation of the handle 173 causes the motor 140 to stop and start.

As soon as hydraulic flow of the fluid is directed to the motor 140, the motor 140 begins to turn which in turn begins the operation of the unloading assembly 28 of the trailer 22. The use of the hydraulic motor 140 and the speed reducer 158 to drive the conveyor 114 of the assembly 28 causes the conveyor 114 to accelerate from rest to its operating speed smoothly and gradually without any jerking or overloading whatsoever. As the conveyor 114 continues to turn, it operates to unload asphalt from the hopper 26 out the rear of the trailer 22 and into the paving machine 30 of the system 20.

The conveyor 114 operates by shearing the bottom portion of the asphalt contained within the hopper 26 from the remainder of the asphalt along a line determined by the positioning of the door 80 with respect to the floor 64 of the hopper 26. Thus, the position of the door 80 as well as the speed of operation of the motor 140 as determined by the positioning of the control handle 174 of the valve 164 determines the rate of unloading of the asphalt from the trailer 22 into the paving machine 30. During the unloading of the asphalt, the bridging members 70 of the hoppers 26 tend to support the bulk of the asphalt in the hopper 26 over the conveyor 114. This reduces the packing of asphalt in the hopper 26 and also reduces the load on the conveyor 114 during the initial portion of the unloading operation.

During normal unloading operation, the conveyor 114 of the unloading system 28 is operated continuously. Since the rate at which asphalt is unloaded from the trailer 22 is controllable by adjusting the position of the door 80 and the position of the control handle 174, the system 20 delivers asphalt from each trailer 22 into the paving machine 30 at the exact rate at which the asphalt is required by the paving machine 30. At the end of the unloading operation, the control handle 174 is moved downwardly against the action of the spring 175 to increase the speed of operation of the motor 140. This causes the conveyor 114 to move rapidly through the hopper 26, thereby quickly unloading any asphalt remaining in the hopper 26 into the paving machine 30.

When the unloading of a trailer 22 has been completed, the trailer is returned to the asphalt plant by the tractor 24. As the trailer is moved away from the paving machine 30, the cable 194 of the connection assembly 36 operates the front plate 182 to uncouple the female quick disconnect fittings 178 from the male quick disconnect fittings 146. This action immediately terminates the operation of the unloading assembly 28 of the trailer 22 since it terminates the flow of hydraulic fluid to the motor 140. The quick disconnect fittings 146 and 178 prevent the loss of hydraulic fluid from the tubes 150 and 172.

It should be understood that the trailer 22 can be used to deliver many materials other than hot asphalt. For example, the trailers 22 may be used to deliver sand and/or gravel to paving sites for use in forming a pavement base. In such a case, it is normally not necessary to preheat the hoppers 26 of the trailer 22. Additionally, the trailers 22 may be employed to transport raw aggregrate to an asphalt plant on return trips from a paving site. In such a case the trailers earn money on both legs of a trip. Finally, the trailers can be used to transport and unload materials entirely unrelated to the paving industry.

The unloading system illustrated in the drawings is superior to prior delivery systems in several respects. For example, the use of the system does not involve the raising of a dump bed. Therefore, the trailers of the system do not tend to overturn, even when they are unloaded on a steep bank or grade. Further, asphalt is unloaded by the system smoothly and evenly without tending to form into clumps that fall suddenly into the paving machine.

Another advantage of the material delivery system shown in the drawings over prior systems results from the use of the preheating system to prevent heat loss from the asphalt as it is transported. This permits the asphalt to be delivered to paving sites considerably more remote than has been possible heretofore. The preheating system also permits temporary storage of the asphalt at paving sites in the trailers of the system for a relatively long period of time.

A very important advantage inherent in the present material delivery system involves the positioning of the control of the unloading assemblies of the system on the paving machine. This not only results in the delivery of asphalt at the exact rate at which asphalt is required by the paving machine but also assures the immediate termination of the delivery of asphalt upon any separation between the trailers of the system and the paving machine. Thus, the problem of removing asphalt accidentally dumped in front of a paving machine which has plagued prior delivery systems is completely eliminated.

Although only one embodiment of the invention is illustrated in the drawings and described in the foregoing specification, it will be understood that the invention is not limited to the embodiment disclosed but is capable of rearrangement, modification and substitution of parts and elements without departing from the spirit of the invention.

What is claimed is:
1. A material delivery apparatus comprising:
a material receiving mechanism;
a vehicle including a controllable material unloading mechanism and adapted to receive material from a dispensing source, to transport material from the dispensing source to the receiving mechanism, and to deliver material to the receiving mechanism, and
cooperating means on the receiving mechanism and the vehicle for actuating the unloading mechanism of the vehicle only when the vehicle is in position to deliver material to the receiving mechanism.

2. The material delivery apparatus according to claim 1 wherein the cooperating actuating means includes means for supplying operating power to the unloading mechanism of the vehicle.

3. The material delivery apparatus according to claim 2 wherein the unloading mechanism of the vehicle includes an unloading conveyor and a motor for driving the conveyor and wherein the power supplying means supplies operating power to the motor.

4. The material delivery apparatus according to claim 1 wherein the unloading mechanism of the vehicle and the cooperating actuating means includes cooperating means for preventing operation of the unloading mechanism whenever the vehicle is separated from the receiving mechanism by more than a predetermined distance.

5. A material delivery apparatus comprising:
a paving material delivery vehicle including an unloading mechanism;
a paving machine cooperatively associated with the paving material delivery vehicle for receiving paving material unloaded from the vehicle by the unloading mechanism, and
unloading control means mounted on the paving machine for controlling the rate of operation of the unloading mechanism.

6. The material delivery apparatus according to claim 5 wherein the vehicle includes a hopper, wherein the unloading mechanism includes a conveyor for transporting material from the hopper to the receiving mechanism and wherein the operation controlling means controls the operation of the conveyor.

7. The material delivery apparatus according to claim 6 wherein the unloading mechanism further includes a motor for driving the conveyor, further including a source of driving power for the motor and wherein the operation controlling means operates by controlling the driving power supplied to the motor by the power source.

8. The material delivery apparatus according to claim 7 wherein the power source is positioned on the receiving mechanism and further including a coupling for interconnecting the power source on the receiving mechanism and the conveyor driving motor on the vehicle.

9. The material delivery apparatus according to claim 8 further including means for separating the coupling and thereby preventing operation of the conveyor whenever the vehicle and the receiving mechanism are separated by more than a predetermined distance.

10. The material delivery apparatus according to claim 5 wherein the vehicle includes a hopper having inwardly sloping sides and wherein the unloading mechanism includes a conveyor extending through the center of the hopper toward the rear of the vehicle.

11. The material delivery apparatus according to claim 10 further including at least one bridging member extending between the sides of the hopper over the conveyor.

12. The material delivery apparatus according to claim 11 further including heat conveying passageways extending along the sides of the hopper.

13. A material delivery apparatus comprising:
a paving material delivery vehicle;
means mounted on the vehicle for unloading paving material from the vehicle;

a paving machine for receiving paving material unloaded from the vehicle, and unloading control means extending between the paving machine and the delivery vehicle and responsive to separation between the delivery vehicle and the paving machine for preventing the operation of the unloading means when the vehicle and the paving machine are separated.

14. The material delivery apparatus according to claim 13 wherein the delivery vehicle is a semi-trailer and wherein the unloading means includes a conveyor extending axially of the trailer and a motor for operating the conveyor.

15. The material delivery apparatus according to claim 13 wherein the unloading control means includes a power source for the unloading means together with means for coupling the power source to the unloading means.

16. In a material delivery apparatus, a paving material delivery control device comprising:
   a paving material delivering mechanism;
   a paving machine for receiving paving material from the delivering mechanism, and
   unloading control means cooperatively related to the material delivery mechanism and the paving machine and extending between the delivering mechanism and the paving machine for controlling the operation of the delivering mechanism from the paving machine.

17. The control apparatus according to claim 16 wherein the operation controlling means further includes means mounted on the paving machine for supplying driving power to the delivering mechanism.

18. The control apparatus according to claim 17 further including a coupling for connecting the power supplying means and the operation controlling means to the delivering mechanism.

19. The control apparatus according to claim 16 wherein the operation controlling means operates to prevent the delivering mechanism from delivering paving material upon separation of the delivering mechanism and the paving machine.

References Cited
UNITED STATES PATENTS

| | | | |
|---|---|---|---|
| 2,490,241 | 12/1949 | Smith | 214—83.16 |
| 2,670,836 | 3/1954 | Ball | 198—76 |
| 2,747,476 | 5/1956 | Manuel | 94—44 |
| 2,779,508 | 1/1957 | Ensinger | 222—178 |
| 2,805,784 | 9/1957 | Dokken | 214—83.36 |
| 2,906,438 | 9/1959 | Carpenter | 222—177 |
| 3,016,809 | 1/1962 | McNeill | 94—46 |
| 3,064,837 | 11/1962 | Manney | 214—83.36 |
| 3,107,592 | 10/1963 | Mengel | 94—46 |
| 3,398,662 | 8/1968 | Takata | 94—39 |
| 3,452,885 | 7/1969 | Love | 214—38 |

NILE C. BYERS, JR., Primary Examiner

U.S. Cl. X.R.

214—38